United States Patent
Frye et al.

(10) Patent No.: US 9,223,470 B2
(45) Date of Patent: Dec. 29, 2015

(54) METHOD FOR MONITORING A TECHNICAL INSTALLATION AND MONITORING SYSTEM FOR CARRYING OUT SAID METHOD

(75) Inventors: Uwe Frye, Hagenbach (DE); Eckhard Seibert, Hagenbach (DE); Horst Walz, Straubenhardt (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1051 days.

(21) Appl. No.: 12/677,866

(22) PCT Filed: Sep. 12, 2008

(86) PCT No.: PCT/EP2008/062186
§ 371 (c)(1),
(2), (4) Date: Sep. 16, 2010

(87) PCT Pub. No.: WO2009/037206
PCT Pub. Date: Mar. 26, 2009

(65) Prior Publication Data
US 2011/0046753 A1     Feb. 24, 2011

(30) Foreign Application Priority Data

Sep. 14, 2007  (DE) .......................... 10 2007 044 080

(51) Int. Cl.
| G05B 23/02 | (2006.01) |
| G06F 3/0482 | (2013.01) |
| G06F 11/32 | (2006.01) |

(52) U.S. Cl.
CPC ............ *G06F 3/0482* (2013.01); *G05B 23/027* (2013.01); *G05B 23/0272* (2013.01); *G06F 11/324* (2013.01); *G05B 2219/31455* (2013.01)

(58) Field of Classification Search
CPC . G05B 23/0272; G06F 3/0484; G06F 3/0482; G06F 9/546
USPC ......... 715/771, 965, 736, 734; 700/80, 83, 27
See application file for complete search history.

(56) References Cited

U.S. PATENT DOCUMENTS

| 5,006,976 | A  | * | 4/1991 | Jundt ............................... 700/79 |
| 6,438,716 | B1 | * | 8/2002 | Snover ............................. 714/57 |
| 7,206,646 | B2 | * | 4/2007 | Nixon et al. .................... 700/83 |
| 7,692,537 | B2 | * | 4/2010 | Skold et al. ................... 340/506 |
| 2002/0055790 | A1 | * | 5/2002 | Havekost ........................ 700/80 |
| 2005/0096872 | A1 |   | 5/2005 | Beoughter |
| 2007/0156266 | A1 |   | 7/2007 | Jensen |

FOREIGN PATENT DOCUMENTS

| DE | 10223725 A1 | 4/2003 |
| DE | 10348563 A1 | 5/2004 |
| GB | 2379749 B | 8/2005 |

* cited by examiner

*Primary Examiner* — Nicholas Ulrich

(57) ABSTRACT

A method for monitoring a technical installation with a plurality of installation components connected to one another for transmitting data in order to perform process steps is provided. Status messages, each status message containing a plurality of individual messages, are displayed on a display unit. Upon initiation of the display of a status message, it is determined which individual messages assigned to the status message are to be displayed.

5 Claims, 3 Drawing Sheets

METHOD FOR MONITORING A TECHNICAL INSTALLATION AND MONITORING SYSTEM FOR CARRYING OUT SAID METHOD

CROSS REFERENCE TO RELATED APPLICATIONS

This application is the US National Stage of International Application No. PCT/EP2008/062186 filed Sep. 12, 2008, and claims the benefit thereof. The International Application claims the benefits of German Application No. 10 2007 044 080.6 DE filed Sep. 14, 2007. All of the applications are incorporated by reference herein in their entirety.

FIELD OF INVENTION

The invention relates to a method for monitoring a technical installation having a plurality of installation components connected to one another on the data side to carry out process steps, in which status messages, each comprising a number of individual messages, are displayed as required on a display unit. It also relates to a monitoring system for a technical installation having a plurality of installation components connected to one another on the data side to carry out process steps, having a display unit to display status messages as required, in particular to carry out the method.

SUMMARY OF INVENTION

Large quantities of different measurement data are constantly produced in a control room for controlling a technical installation, in particular a power plant or in so-called process control systems, said measurement data as a whole describing the installation or operating status of the technical installation. Operators of the installation are faced with the task of identifying the measurement data or measurement variables of relevance to the operating status in each instance and tracking, analyzing and interpreting the values of such measurement data or measurement variables in relation to the status of the installation. Process management in the control room or in the process control system generally utilizes suitable display units, in particular screens or monitors, by way of which operators can be provided with appropriate information for the respective situation or requirements.

When monitoring relatively complex technical installations, which generally comprise a plurality of installation components connected to one another on the data side to carry out process steps, abnormal statuses, which for example indicate malfunctions of individual components or characterize a need for action on the part of the operator in the form of warning messages or the like, are output in the form of corresponding status messages to the respective display unit in such process control systems, so that operators can see the information. Such status messages, which are generally output as so-called message windows using conventional display technology, usually comprise a plurality of individual messages or individual information items, which overall represent the information content of the respective status message. In the case of status messages relating to specific installation components in particular the individual information items or messages contained therein can contain for example measurement values or parameters of relevance to the respective installation component or even further information about further installation components assigned to the respective installation component or connected to it on the data side.

Generally the status messages to be displayed for the respective situation or requirement are displayed in the form of preconfigured message windows, with the information content being allocated to the respective message windows during the design stage of the technical installation by manual or project-related assignment of installation parts, parameters or the like to the respective status message or message window. The content of or information contained in the respective status message or the message window generated for this in each instance therefore contains all the messages from the assigned message sources, in other words for example the sensors, pickups and the like allocated to the assigned installation components, so that the information content of the respective status message or the corresponding message window is relatively comprehensive and complex. Precisely because of the generally large quantities of data involved here operators have to filter the displayed information to reduce the quantity of information provided to a processable magnitude, in order to identify causes correctly or make correct diagnoses.

An object of the invention is to specify a method for monitoring a technical installation of the type mentioned above, which allows the information to be displayed to be prepared in a particularly appropriate and user-friendly manner when generating a status message. A monitoring system for a technical installation that is particularly suitable for carrying out the method is also to be specified.

According to the invention this object is achieved in respect of the method in that it is determined during the initiation of the display of a status message which individual messages are to be displayed for said status message.

The invention is based on the consideration that a particularly user-friendly and operator-friendly monitoring system can be achieved in respect precisely of the generally high level of complexity and diversity of the installation-relevant information, in that an appropriate prefiltering of the information to be displayed is undertaken at an early stage, in other words particularly during the generation of the status messages. In order in this process to facilitate the diagnosis of the installation status and therefore also a targeted action and response on the part of the operator, the available information should be prefiltered in a particularly targeted and focused manner. Provision is made here for the content of or information contained in the status message to be generated not to be processed statically, and thus using preconfigured information structures, but instead to be processed dynamically, in other words in particular in a situation-related manner.

A particularly high degree of targeted and focused preprocessing and prefiltering of the available information can be achieved in that in a particularly advantageous embodiment the individual messages to be displayed as part of the respective status message are determined in a context-related manner. "Context-related" here means in particular that the information content of the status message to be displayed and therefore the individual messages to be selected is/are selected as a function of the context, from which the status message is to be generated.

In one advantageous embodiment the individual elements can be selected in a context-related manner in that to display a status message assigned to a specific installation component or a group of installation components, the individual messages to be displayed for this are selected as a function of the data-side linking of the respective installation component or group of installation components to other installation components. During the context-related selection of the individual messages to be displayed therefore the data-side linking of different installation components to one another in particular and therefore their mutual influence is also taken into account. Context here can in particular be seen as being that message elements are selected using function plans or the control structure of the system according to the functions shown in a process image, with process images representing the process engineering view of the process and being able to be used for process observation or control. Pictograms for example can also be integrated in such process images.

Context in this sense can also refer to messages from an automation level, such as the overview, area or individual level, with the automation level providing the control-related view of function sequences. Context can also refer to messages from an individual automation function, shown in process images or in an automation level.

In an alternative or additional advantageous development the individual messages to be displayed as part of a status message can also be selected as a function of the situation or operating status, with the individual messages to be displayed for a status message expediently being selected as a function of the operating conditions triggering the display of the status message for the display of said status message. It is then possible to take account in particular of whether the display of a status message is triggered in an automated manner, in other words as a warning message, or manually, in other words as a request for information initiated by the operator. If a status message is triggered manually, for example by the operator clicking on a corresponding symbol on the display unit, it is possible to take into account the context when selecting the individual messages, in that parameters relating to basic conditions of the context from which the clicking action took place are included in the selection of the individual messages. The context from which the clicking action took place can for its part be represented by a window or a subunit thereof, e.g. by a graphic object, in particular a pictogram-type representation of an installation component, a unit or a function symbol.

In respect of the monitoring system the cited object is achieved in that a control unit provided to output status messages to the display unit determines, before a status message is output, which individual messages are to be displayed for said status message.

The control unit advantageously determines the individual messages to be displayed for a status message as a function of context.

In a particularly expedient development the status messages are displayed in the form of message windows.

The advantages achieved with the invention consist in particular of the fact that the context-related selection of the information or individual messages to be displayed as part of a status message gives rise to a particularly targeted and appropriate preselection of the individual information to be displayed. This gives the operator a particularly simplified picture of and access to the information of particular relevance to the situation in the manner of suitable processing and preparation of the information to be displayed, so that the diagnosis of installation statuses and a suitable response to it are particularly facilitated.

BRIEF DESCRIPTION OF THE DRAWINGS

An exemplary embodiment of the invention is described in more detail below with reference to a drawing, in which.

Identical parts are shown with the same reference characters in all the figures.

DETAILED DESCRIPTION OF INVENTION

Figure 1:
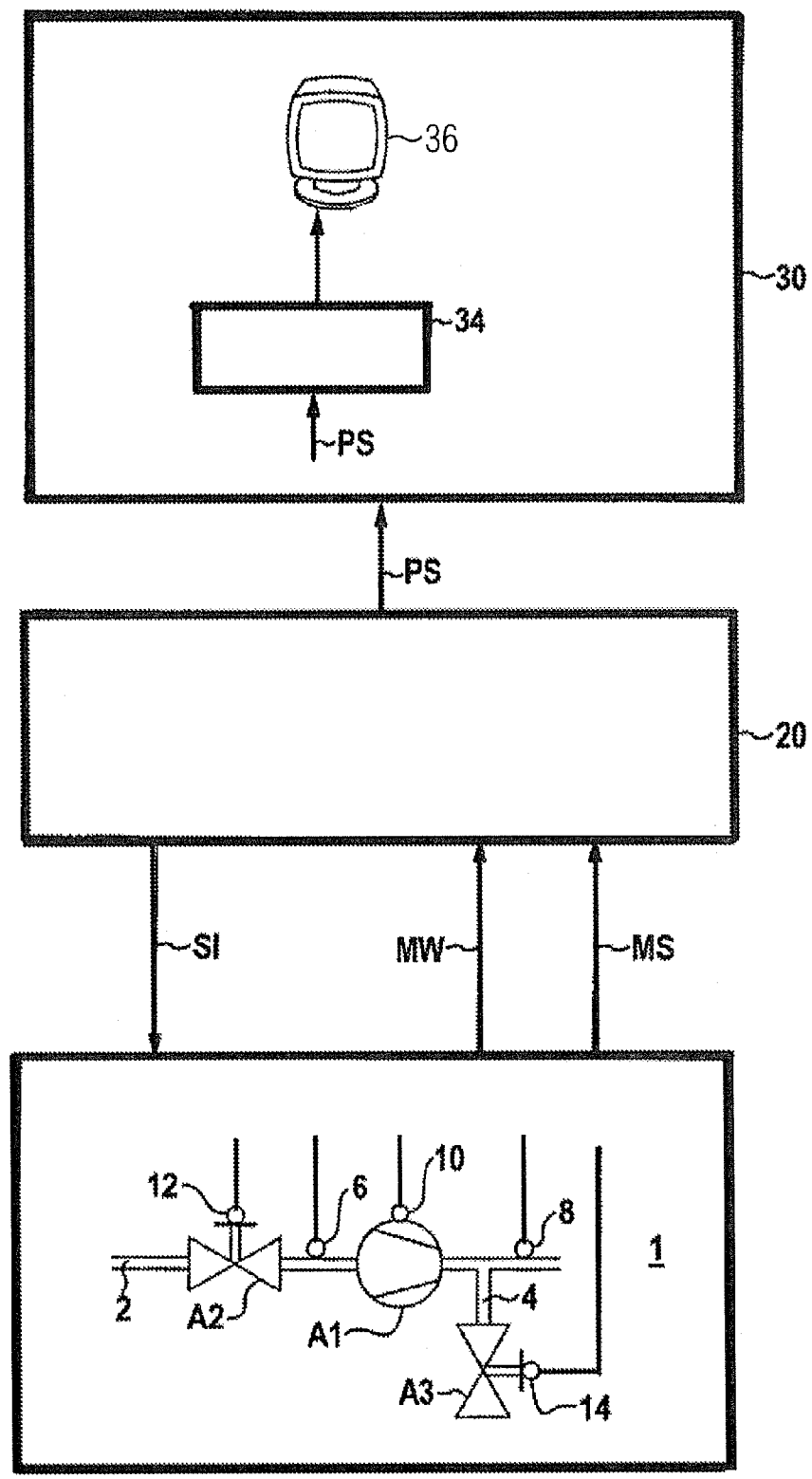
FIG. 1 shows a function diagram of a process with components provided to carry out a method for monitoring a technical installation, and FIGS. 2, 3 respectively show a screen shot for a technical installation or an associated process with at least one status message in the form of a message window.

The process sequence within an installation 1 shown in the exemplary embodiment according to FIG. 1 is part of an overall process in a power plant (not shown in detail). The installation 1 comprises a pump A1 connected in a steam line 2, with an upstream steam valve A2 and a blow-off regulating valve A3 connected in a branch line 4. A throughflow sensor 6 is provided between the pump A1 and the steam valve A2, being used to detect the quantity of steam flowing through the steam line 2 per unit of time. A pressure sensor 8 is also provided on the pressure side of the pump A1. The pump A1 is provided with a speed sensor 10. The steam valve A2 and the blow-off regulating valve A3 each have a control and message element 12 and 14. The pump A1 and the steam valve A2 as well as the blow-off regulating valve A3 are referred to below as installation components A1 to A3.

Measurement values MW detected by the sensors 6, 8 and 10 and message signals MS emitted by the message elements 12 and 14 are supplied to an automation system 20. The measurement values MW and message signals MS are pre-processed into process signals PS in the automation units of the automation system 20. In some instances control signals SI are emitted to the installation components A1 to A3 of the installation 1. The power plant with its installation components A1 to A3 is controlled and monitored automatically by the processes operating within the automation system 20.

The process signals PS generated in the automation units of the automation system 20 from measurement values MW and/or message signals MS detected online are then supplied to a central monitoring system 30, for example a control system or a process control system. The monitoring system 30 can in particular be a suitable data processing unit. The monitoring system 30 here is used in particular in the manner of a central process system for process management and monitoring.

In the event of a failure or some other abnormal status of the monitored process or one of the installation components A1 to A3, the process signals PS generated for this failure from measurement values MW or message signals MS detected online are supplied to a control unit 34 of the monitoring system 30. If a fault in an installation part (not shown) connected in the steam line 2 causes the pressure to rise in the steam line 2, the speed of the pump A1 drops and the blow-off regulating valve A3 opens. The automation system 20 then closes the steam valve A2 by means of a control signal SI, so that the speed of the pump A1 normalizes and the blow-off regulating valve A3 closes again. When the steam valve A2 is then reopened by the automation system 20, the pressure within the steam line 2 rises again and the process is repeated until the fault is eliminated.

Measurement values MW describing this process, e.g. the quantity of steam detected by the throughflow sensor 6 and the steam pressure detected by the pressure sensor 8 and the pump speed detected by the speed sensor 10, are supplied to the automation system 20. The control signals SI for the opening or closing of the valves A2 and A3 are output by the automation system 20 of the installation 1 in response to the measurement values MW received in the automation system 20. Process signals PS are produced from the measurement values MW and the control signals SI for analysis purposes.

To inform the operator and in some instances to allow manual intervention in the process sequences, in the event of such abnormal situations or failures the control unit 34 generates or supplies status messages, which can be displayed on an assigned display unit 36 in the form of message windows. In order to allow the information to be displayed in a manner that is particularly appropriate for the respective situation and requirements and therefore to allow the operator to intervene in a particularly focused manner, provision is made for appropriate prefiltering of the available information when generating the status message. To this end the information content or individual messages to be used to form the status message is/are selected as a function of the situation and as a function of the context.

Figure 2:
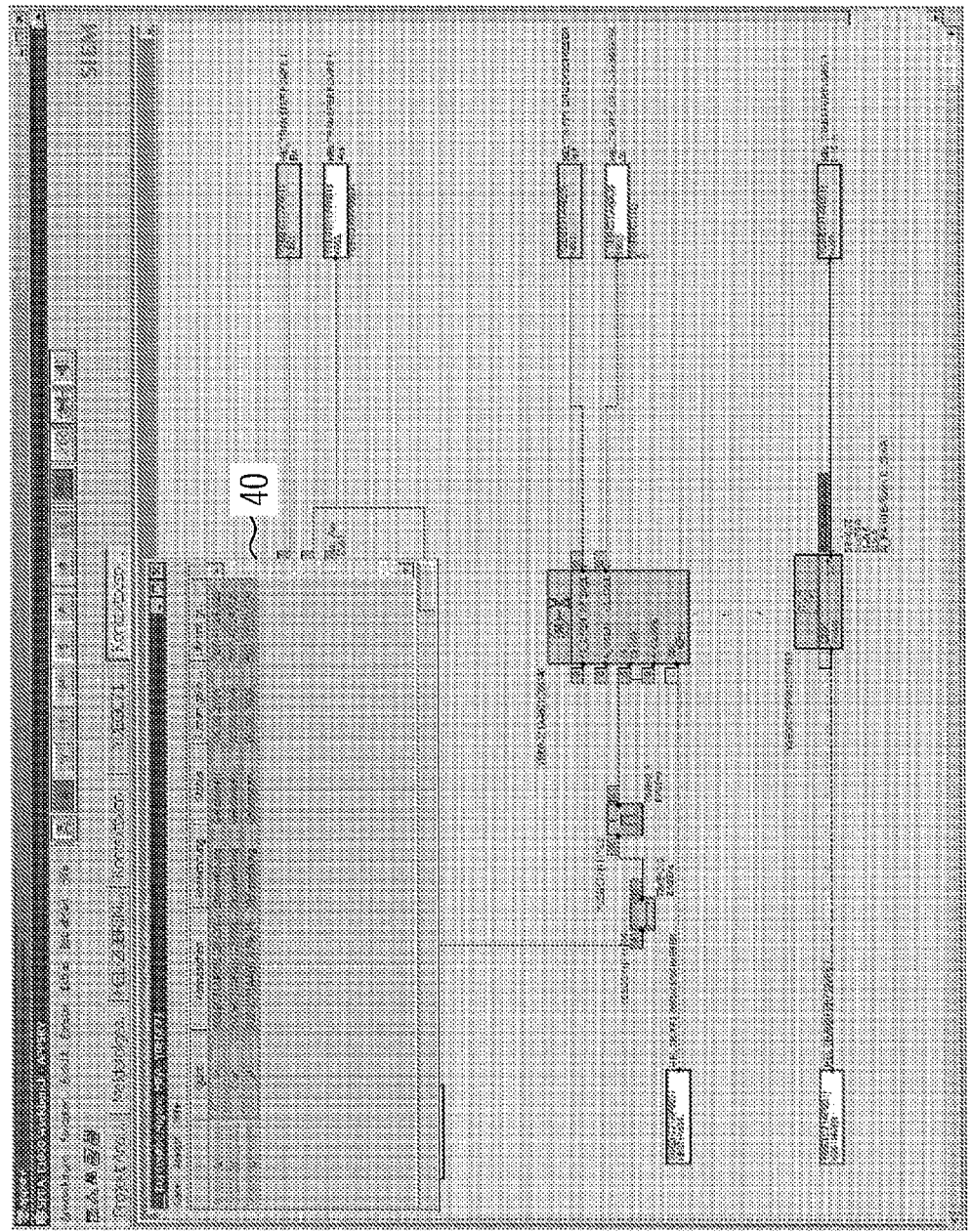
Figure 3:
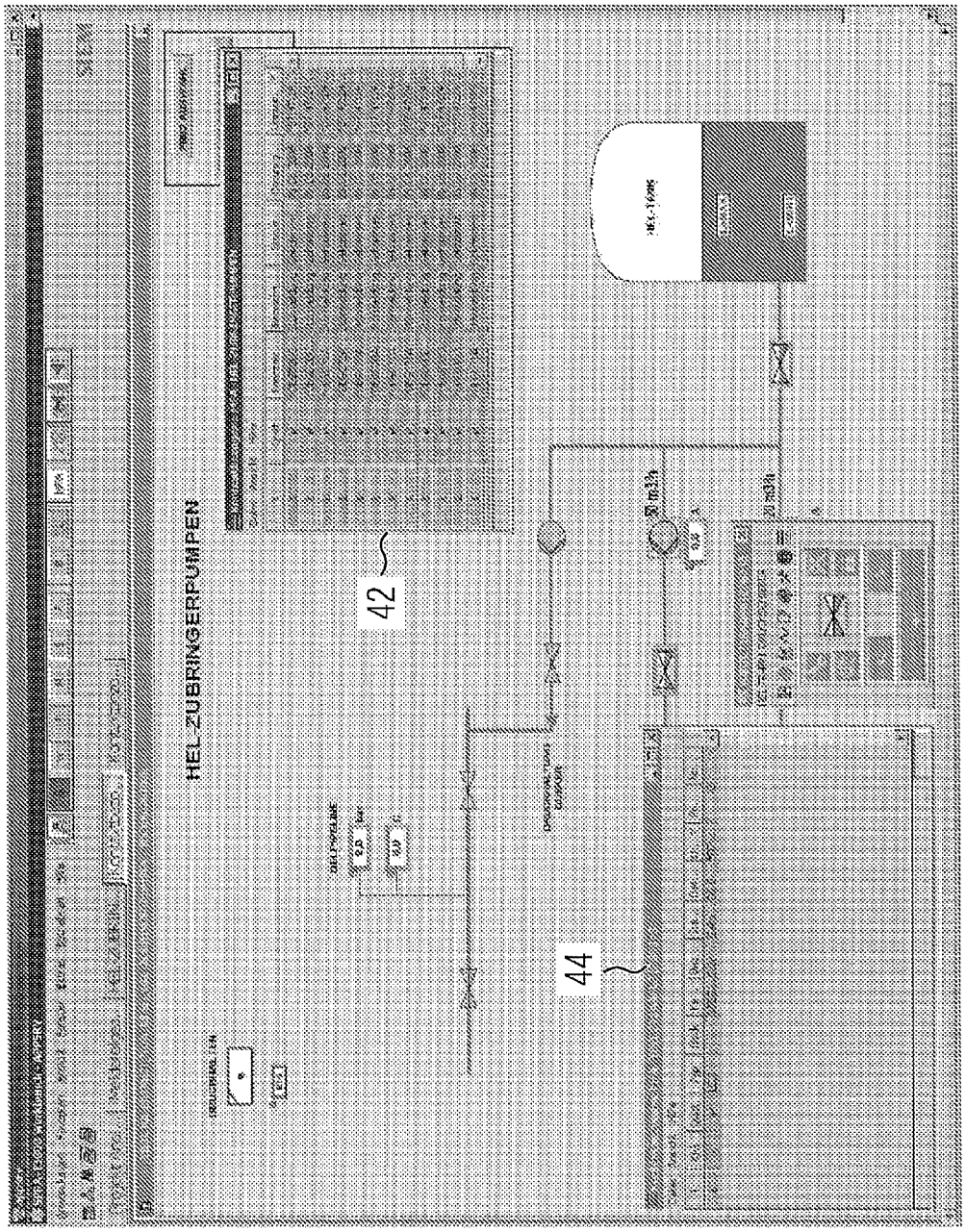

The status messages here are output in the form of so-called message windows 40, 42, 44 on the display unit 36, as shown for example in the screen shots according to FIGS. 2 and 3. Context-related selection of the individual messages or information items to be taken into account here means the following in particular:

messages from the functions shown in a process image: process images represent the process engineering view of the process and are used for process observation and process operation. Pictograms for example are integrated in the process images.

messages from an automation level (overview, area or individual level): the automation level represents the control-related view.

messages from an individual automation function are shown in process images or in an automation level. The automation function comprises a pump, a valve or a regulator for example.

During the preparation and preprocessing of the information it is possible for example to click on the pump A1 in a pictogram of a process image, whereupon all the messages relating to the pump A1 appear in an assigned message window on actuation of the right mouse button. A corresponding information assignment can likewise be provided for other constellations or contexts. Clicking on a software module or a (graphic) object, which represents a defined function in the power plant, in the corresponding view on the display unit 36 causes relevant messages relating to this object or module to be displayed in response to such an operator request.

The messages to be displayed in a message window are determined automatically using the information from a data model, which contains relationships between message sources and contexts. The search criterion here results from the context, from which the message window is opened.

Specifically for example the screenshot in FIG. 3 contains a diagrammatic representation of interlinked installation components in a major technical installation with assigned process and status parameters within a basic window. This is a specific segment from a larger process image (process engineering view). The individual installation components are shown in the manner of pictograms in the form of graphic objects.

In the event of failures or particular operating situations, which are detected and identified automatically by suitable measurement sensors and monitoring routines within the installation, the components or units affected or the associated status parameters are automatically highlighted in color, for example in the signal color red, in the screen display by the installation controller.

An operator alerted in this manner can click on a free area of the basic window with a mouse input device or the like and use the right mouse button to call up the message window 42, in which a number of status reports of relevance to the selected segment of the process image, i.e. the context thus defined, are displayed. In particular the message window 42 can contain a tabular list, in the manner of a brief summary, of status reports from all the installation components displayed on the image segment of the basic window. The individual messages bundled in this manner can each contain for example a serial number, identification code, type designation or group assignment, error description, date and time stamp, associated parameters and optionally further status information.

The operator can also click on the individual graphic objects, which represent the installation components—in particular the graphic objects highlighted in color, which represent the faulty or "conspicuous" installation components having particular operating statuses—and call up or bring to the foreground, for example by actuating the right mouse button, a message window 44 specifically for the respective component containing (preferably exclusively) component-specific individual messages.

Since such context-specific message windows are preferably only shown further to a corresponding operator request, the operator is spared a multitude of automatically overlaid "popup" windows.

The same function mechanism is shown in FIG. 2 for a screenshot which represents a corresponding control-related, i.e. higher order or comprehensive and abstract, view of the technical installation to be monitored and its control sequences. Corresponding message windows 40 can be called up as required here too, providing context-related content.

The invention claimed is:

1. A method for monitoring a technical installation with a plurality of installation components configured for performing a process, the method comprising:

connecting the installation components to one another for transmitting data in order to perform process steps;

displaying status messages on a display unit, each status message comprising a plurality of individual messages; and determining during the generation of a status message and prior to the display of said status message, which individual messages are to be displayed for the status message, wherein the individual messages from which the status message is to be generated are selected as a function of a context, wherein the individual messages to be displayed are determined automatically using information from a data model, which contains relationships between message sources and contexts, wherein for displaying a status message assigned to a specific installation component or a group of installation components, the individual messages to be displayed for this are selected as a function of a data-side linking and mutual influence between the said specific installation component or group of installation components and other installation components, wherein selecting individual status messages as a function of context comprises selecting the individual status messages using functions shown in a process image, wherein a process image represents a process engineering view of the process and being able to be used for process observation or control, or using functions from an automation level, the automation level providing a control-related view of function sequences in the process, and wherein the method further comprises receiving an operator input to select an individual component shown in the process image or automation level, whereupon all messages relating to the selected component appear in an assigned message window.

2. The method as claimed in claim 1, wherein the status message is displayed in the form of a message window.

3. The method as claimed in claim 1, wherein the individual messages to be displayed for a status message are selected as a function of the operating conditions triggering the display of the status message.

4. A monitoring system for a technical installation with a plurality of installation components connected to one another for transmitting data in order to perform process steps, the monitoring system comprising:
- a display unit to display status messages;
- a control unit to output status messages to the display unit,
- wherein the control unit determines, during the generation of a status message and before the status message is output, which individual messages are to be displayed for the status message,
- wherein the control unit determines the individual messages to be displayed for a status message as a function of context, the individual messages to be displayed being determined automatically using information from a data model, which contains relationships between message sources and contexts,
- wherein for displaying a status message assigned to a specific installation component or a group of installation components, the control unit selects the individual messages to be displayed for this as a function of a data-side linking and mutual influence between the said specific installation component or group of installation components and other installation components,
- wherein the control unit selects individual status messages as a function of context comprises selecting the individual status messages using functions shown in a process image, wherein a process image represents a process engineering view of the process and being able to be used for process observation or control, or using functions from an automation level, the automation level providing a control-related view of function sequences in the process, and
- wherein control unit receives an operator input to select an individual component shown in the process image or automation level, whereupon all messages relating to the selected component appear in an assigned message window in the display unit.

5. The monitoring system as claimed in claim 4, wherein the display unit is configured to display the status message in form of a message window.

* * * * *